Figure 1:
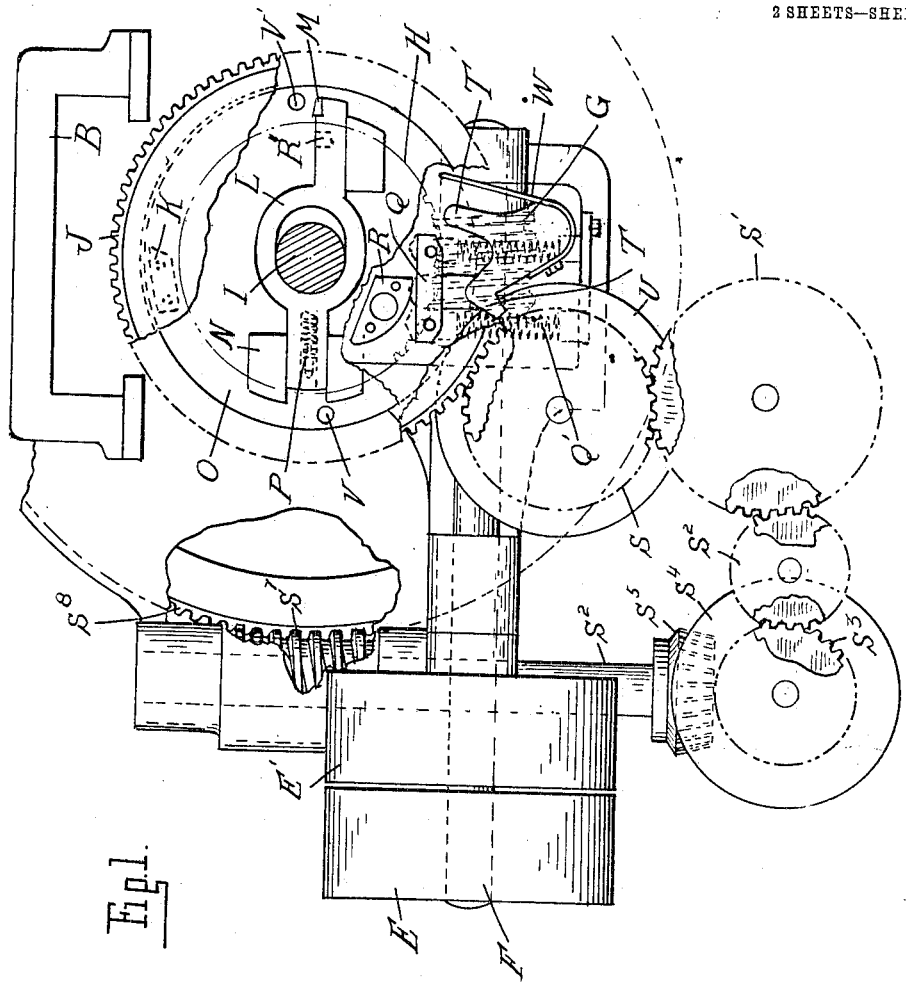

F. A. WARD.
GEARING.
APPLICATION FILED AUG. 2, 1909.

965,774.

Patented July 26, 1910.

2 SHEETS—SHEET 1.

Witnesses
W. L. Ford
W. B. Belknap

Inventor
Frederick A. Ward
By Whittemore Hulbert & Whittemore
Atty's

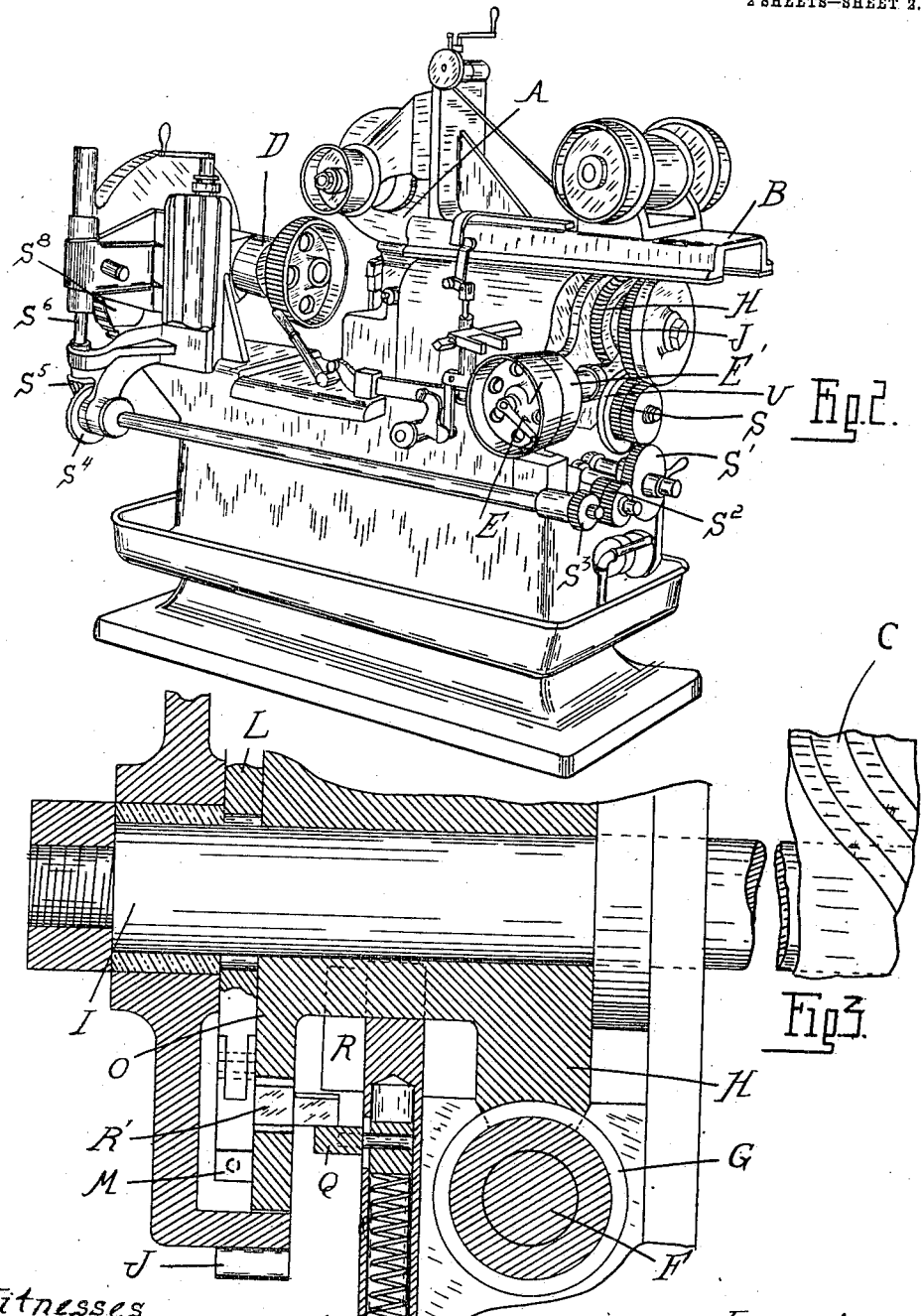

UNITED STATES PATENT OFFICE.

FREDERICK A. WARD, OF DETROIT, MICHIGAN, ASSIGNOR TO GEAR GRINDING MACHINE COMPANY, OF DETROIT, MICHIGAN, A CORPORATION OF MICHIGAN.

GEARING.

965,774.  Specification of Letters Patent.  Patented July 26, 1910.

Application filed August 2, 1909. Serial No. 510,697.

*To all whom it may concern:*

Be it known that I, FREDERICK A. WARD, a citizen of the United States of America, residing at Detroit, in the county of Wayne and State of Michigan, have invented certain new and useful Improvements in Gearing, of which the following is a specification, reference being had therein to the accompanying drawings.

The invention relates to gearing, more particularly designed for use in connection with the indexing mechanism of gear grinding machines, and it is the object of the invention to obtain a positive and accurate adjustment and one having considerable range of variation.

To this end, the invention consists in various features of construction as hereinafter set forth.

In the drawings—Figure 1 is a sectional elevation of the machine; Fig. 2 is a perspective view of the machine, and Fig. 3 is a section taken at right angles to the plane of Fig. 1.

My improved mechanism is applicable to various constructions of machines, but, as shown, it is used in connection with a gear grinding machine, in which A is a grinder wheel and B a reciprocatory carriage on which said wheel is mounted.

C is a rotary cam for reciprocating the carriage, and D a rotatively adjustable arbor or workholder. The indexing device is arranged to be automatically operated by mechanism timed in relation to the cam C and by its operation the arbor D is intermittently adjusted a predetermined amount, the construction being as follows: E and E' are tight and loose pulleys upon a shaft F, upon which is mounted a worm G meshing with the worm wheel H, which actuates the shaft I having the cam C thereon. This cam C is so positioned as to impart to the reciprocatory carriage B an intermittent movement, and during the period of rest of the carriage the indexing mechanism is operated. This mechanism includes a positively actuated clutch for automatically coupling and disengaging the drive gear J from the shaft I, and a train of mechanism, including a change gearing, through which the movement is transmitted to the arbor D.

In order to secure a positive and absolutely accurate adjustment of the indexing mechanism I employ a type of clutch of the following construction: K are shoulders upon the gear wheel J, preferably formed of hardened blocks secured to said wheel, and accurately spaced from each other. As shown, two of these blocks are employed, and they are arranged at diametrically opposite points on the wheel. L is a dog carried by the drive member and adjustable thereon into and out of the path of the members K. The member L is also preferably provided with a hardened block M for contacting with the blocks K, and, as shown, this member is radially slidable in bearings formed by lugs N on a drive wheel O rotating with the shaft I. P is a spring operating to project the member L so that the block M is in the path of the blocks K. Q is a disengaging member actuated by springs Q' of greater tension than the spring P. This member Q is arranged at a fixed point in the travel of the member L and is adapted to bear against said member to actuate the same against the tension of the spring P, but, to secure a fixed time of disengagement, means is provided for temporarily locking the member L from movement, comprising a fixed cam R, which engages with a projecting finger R' on the member L. The arrangement is such that the finger R' will travel into contact with the cam R before engagement with the member Q, and as long as the members R and R' are thus engaged the member L is held from radial movement. During the continued engagement, the springs Q' are placed under tension, and finally the finger R' passes beyond the end of the member R and is released therefrom. These springs will instantaneously actuate the member Q and the member L thereby, so as to drop the block M from the path of the block K and permit the latter to remain stationary.

It will be understood from the description given above that the gear wheel J remains stationary during the period in which the member L is traveling between the blocks K, and after contact of the block M with the block K said member J travels to the point of disengagement by the member Q. This causes an alternate movement of the carriage B and the member J, as has already been described.

The motion of the gear wheel J is transmitted to the arbor D through the medium of a suitable drive train, which, as shown, comprises the gears S, S', S² and S³, the bevel gear wheels S⁴ S⁵, shaft S⁶, worm S⁷, and worm gear S⁸, which latter is mounted on the arbor D. This train is locked from movement during the interval in which the flange is disengaged, preferably through the medium of a locking dog T, which engages a notch in the periphery of a disk U secured to the gear wheel S. The gear wheels J and S are preferably in the proportion of two to one, and as the former moves exactly one-half of a revolution upon each actuation by the member L it is evident that the gear wheel S and disk U will complete one full revolution. Thus by disengaging the dog T simultaneous with the engagement of the block M with the block K the train is unlocked and is permitted to move until the dog T reëngages with the notch in the disk U, which occurs at the time of disengagement of the block M from the block K. As shown, a pin V on the wheel O engages with an operating finger T' on the dog T to disengage it from the notched wheel U against the tension of a spring W. A similar pin V' again actuates the finger T just before registration of the notch in the wheel U with the dog, thereby tensioning the spring W and causing a snapping of the dog into the notch upon the release of the finger from the pin. The variation in degree of adjustment is accomplished by exchanging the gears in the train, and for this purpose the gears S' S² S³ are detachably mounted.

With the construction as described in operation, continuous rotation of the shaft I will cause the alternate reciprocation of the carriage B and the movement of the gear wheel J and driven train. During the movement of the carriage B, the grinder is caused to pass over the work—such as the teeth of a gear wheel—and fashion the same to the proper form, and by reason of the locking of the train by the dog T the work is held rigidly positioned during this movement. During the interval of rest of the carriage, the clutch engages in the manner above described, causing a half revolution of the gear wheel J, which, through the intermediate train, gives the desired adjustment to the arbor D, upon which the work is mounted.

Of course it is to be understood that I have not attempted to describe the numerous modifications of the construction that may be adopted without digressing from my inventive idea.

What I claim as my invention is:

1. The combination of a member to be adjusted, an intermittently actuated member to operate the same, a constantly driven member, means for periodically coupling said constantly driven member and intermittently actuated member, and means to simultaneously disengage said coupling means and lock said intermittently actuated member.

2. The combination of a member to be adjusted, a member to operate the same, a constantly driven device, means for coupling said second member to said device, and means for simultaneously disengaging said coupling means and locking said second member, and for simultaneously engaging said coupling means and unlocking said member.

3. The combination of a member to be adjusted, an intermittently actuated member to operate the same, means to lock said intermittently actuated member during its interval of inaction, a constantly driven member, and means to unlock said intermittently actuated member and couple said constantly driven member thereto.

4. The combination of a member to be adjusted, an intermittently actuated member to operate the same, means to lock said intermittently actuated member, a constantly driven member, means to couple the constantly driven member periodically to the intermittently actuated member, and means to uncouple said members and simultaneously lock the intermittently actuated member.

5. In mechanism such as described, the combination with a member to be adjusted, of an intermittently actuated member, a changeable transmission train between said intermittently actuated member and said member to be adjusted, means for locking said intermittently actuated member during its interval of inaction, a constantly driven member, and means timed by said constantly driven member for unlocking said intermittently driven member for coupling said constantly driven member thereto and for simultaneously uncoupling said members and locking said intermittently actuated member.

6. In mechanism such as described, the combination with the member to be adjusted, of a constantly rotating member, an adjacent rotatable axially alined member, a series of accurately positioned shoulders on one of said members, and a coöperating movable interlocking device on the other of said members; means for yieldingly holding said interlocking device in position for engagement with said shoulders fixedly positioned, means for holding said interlocking device from disengagement, means engaged and placed under tension by said interlocking device while held from disengagement adapted to instantaneously disengage the same when released from said holding means, and a changeable transmission train between said adjacent member and the member to be adjusted.

7. In mechanism such as described, the combination with the member to be adjusted, of actuating means therefor, including a rotatable member; an adjacent constantly rotating axially alined member, interlocking means between said members, including a movable member on said constantly rotating member, and a series of accurately positioned shoulders on the adjacent member, a yieldably pressed member for engaging with said movable member to disengage the same from the coöperating shoulder, and a fixed cam for temporarily holding said movable member from disengagement and for causing the same to tension said yieldably pressed member whereby upon disengagement from said cam, an instantaneous disengagement of said interlocking means is effected.

8. In mechanism such as described, the combination with the member to be adjusted, of a rotatable actuating member therefor, an adjacent axially alined constantly rotating member, interlocking means between said members, including a movable member on said constantly rotating member; a yieldably pressed member in the path of said movable member during the rotation of said constantly rotating member, a stationary cam for engaging said movable member and for holding the same from relative movement on its carrying member during the engagement with said yieldably pressed member whereby the latter is placed under tension and will effect an instantaneous disengagement of said interlocking means upon the release from said cam.

9. In mechanism such as described, the combination with the member to be adjusted, of a changeable transmission train for actuating said member, a constantly rotating member adjacent to and axially alined with the actuating member of said transmission train, a clutch for coupling said adjacent members having accurately positioned points of engagement, and means for instantaneously disengaging said clutch upon the completion of an accurately determined travel from the point of engagement.

10. In mechanism such as described, the combination with the member to be adjusted, of an intermittently actuated member for operating the same, a constantly driven member, a positive clutch for periodically coupling said constantly driven member and intermittently actuated member, and means for simultaneously disengaging said clutch and locking said intermittently actuated member.

11. In mechanism such as described, the combination with the member to be adjusted, an intermittently actuated member for adjusting the same, a constantly driven member, a positive clutch for periodically coupling said constantly driven member and intermittently actuated member, and means for simultaneously and instantaneously disengaging said clutch and locking said intermittently actuated member.

In testimony whereof I affix my signature in presence of two witnesses.

FREDERICK A. WARD.

Witnesses:
W. J. BELKNAP,
HARRY W. GRAHAM.